US012792596B2

(12) United States Patent
Malla et al.

(10) Patent No.: US 12,792,596 B2
(45) Date of Patent: Nov. 10, 2026

(54) SYSTEM AND METHODS FOR ITERATIVE DATA RETRIEVAL

(71) Applicant: Samsung Electronics Co., Ltd., Suwon-si (KR)

(72) Inventors: Srikanth Malla, Fremont, CA (US); Chiho Choi, San Jose, CA (US); Joon Hee Choi, Campbell, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/977,856

(22) Filed: Dec. 11, 2024

(65) Prior Publication Data

US 2026/0017253 A1 Jan. 15, 2026

Related U.S. Application Data

(60) Provisional application No. 63/671,672, filed on Jul. 15, 2024.

(51) Int. Cl.
*G06F 16/00* (2019.01)
*G06F 16/242* (2019.01)

(52) U.S. Cl.
CPC ................................ *G06F 16/2425* (2019.01)

(58) Field of Classification Search
None
See application file for complete search history.

(56) References Cited

U.S. PATENT DOCUMENTS 8,275,803 B2 9/2012 Brown et al.
8,484,015 B1 7/2013 Wolfram et al.
10,489,433 B2 11/2019 Wieweg et al.
11,861,320 B1 1/2024 Gajek et al.
11,861,321 B1 1/2024 O'Kelly et al.
2011/0202543 A1 * 8/2011 Chin .................... G06F 16/583 707/E17.02
2017/0031896 A1 2/2017 Dymetman et al.
(Continued)

FOREIGN PATENT DOCUMENTS

CN 111274265 A * 6/2020
CN 111971669 A * 11/2020
CN 112381670 A * 2/2021
(Continued)

OTHER PUBLICATIONS

Jeong, S. et al., "Adaptive-RAG: Learning to Adapt Retrieval-Augmented Large Language Models through Question Complexity", arXiv:2403.14403v2, Mar. 28, 2024, 15 pages, www.arXiv.org.
(Continued)

*Primary Examiner* — Bai D Vu
(74) *Attorney, Agent, or Firm* — Womble Bond Dickinson (US) LLP

(57) ABSTRACT

A system and methods for iterative data retrieval. In some embodiments, a method includes: obtaining a first result set, from a first vector database, the obtaining being based on proximity to a first vector, the first vector being associated with a query; determining that an iteration criterion is met, the iteration criterion being based on the first result set; and obtaining a second result set from the first vector database, based on the determining that the iteration criterion is met.

20 Claims, 7 Drawing Sheets

(56) References Cited

U.S. PATENT DOCUMENTS

| | | | |
|---|---|---|---|
| 2023/0367960 | A1 | 11/2023 | Smus et al. |
| 2024/0104336 | A1 | 3/2024 | Irving et al. |

FOREIGN PATENT DOCUMENTS

| | | | |
|---|---|---|---|
| CN | 116662524 | A | 8/2023 |
| CN | 117171415 | A | 12/2023 |
| CN | 117311949 | A | 12/2023 |
| WO | WO 2023/200762 | A1 | 10/2023 |

OTHER PUBLICATIONS

Maryamah, M. et al., "Chatbots in Academia: A Retrieval-Augmented Generation Approach for Improved Efficient Information Access", 2024 16th International Conference on Knowledge and Smart Technology (KST), Apr. 17, 2024, pp. 259-264, IEEE.

* cited by examiner

SYSTEM AND METHODS FOR ITERATIVE DATA RETRIEVAL

CROSS-REFERENCE TO RELATED APPLICATION(S)

The present application claims priority to and the benefit of U.S. Provisional Application No. 63/671,672, filed Jul. 15, 2024, entitled "ITERATIVE HYBRID RETRIEVER AND GENERATORS FOR RETRIEVAL AUGMENTED GENERATION", the entire content of which is incorporated herein by reference.

FIELD

One or more aspects of embodiments according to the present disclosure relate to retrieval augmented generation, and more particularly to an iterative data retriever.

BACKGROUND

Machine learning models may find applications in a large variety of tasks, such as classification and generation tasks. When performing classification, a model may, for example, classify medical images as normal or pathological, or classify manufactured parts as acceptable or defective. A generative machine learning model may be used to create text, images, or sounds.

It is with respect to this general technical environment that aspects of the present disclosure are related.

SUMMARY

According to an embodiment of the present disclosure, there is provided a method, including: obtaining a first result set, from a first vector database, the obtaining being based on proximity to a first vector, the first vector being associated with a query; determining that an iteration criterion is met, the iteration criterion being based on the first result set; and obtaining a second result set from the first vector database, based on the determining that the iteration criterion is met.

In some embodiments, the method further includes: obtaining a third result set, from a second vector database, based on proximity to a second vector, the second vector being associated with the query.

In some embodiments, the method further includes: obtaining a third result set, from a second vector database; and generating a fourth result set, based on the first result set and the third result set.

In some embodiments, the method further includes: obtaining a third result set, from a second vector database; and generating a fourth result set, based on the first result set and the third result set, wherein a cardinality of the fourth result set is less than a sum of a cardinality of the first result set and a cardinality of the third result set.

In some embodiments, the method further includes: obtaining a third result set, from a second vector database; and generating a fourth result set, based on the first result set and the third result set, wherein the generating includes: combining the first result set and the third result set; and modifying a duplicate result.

In some embodiments, the method further includes: obtaining a third result set, from a second vector database; and generating a fourth result set, based on the first result set and the third result set, wherein the generating includes:

combining the first result set and the third result set; and modifying a result having a quality metric less than a threshold.

In some embodiments, the method further includes obtaining a third result set, from a second vector database, based on proximity to a second vector, the second vector being associated with the query, wherein the first vector includes a dense vector, and the second vector includes a sparse vector.

In some embodiments, the obtaining of the second result set from the first vector database includes obtaining the second result set from a subset, complementary to the first result set, of the first vector database.

According to an embodiment of the present disclosure, there is provided a storage device, including: a processing circuit; and non-volatile memory, the processing circuit being configured to: obtain a first result set, from a first vector database, the obtaining being based on proximity to a first vector, the first vector being associated with a query; determine that an iteration criterion is met, based on the first result set; and obtain a second result set from the first vector database, based on the determining that the iteration criterion is met.

In some embodiments, the processing circuit is further configured to: obtain a third result set, from a second vector database, based on proximity to a second vector, the second vector being associated with the query.

In some embodiments, the processing circuit is further configured to: obtain a third result set, from a second vector database; and generate a fourth result set, based on the first result set and the third result set.

In some embodiments, the processing circuit is further configured to: obtain a third result set, from a second vector database; and generate a fourth result set, based on the first result set and the third result set, wherein a cardinality of the fourth result set is less than a sum of a cardinality of the first result set and a cardinality of the third result set.

In some embodiments, the processing circuit is further configured to: obtain a third result set, from a second vector database; and generate a fourth result set, based on the first result set and the third result set, wherein the generating includes: combining the first result set and the third result set; and modifying a duplicate result.

In some embodiments, the processing circuit is further configured to: obtain a third result set, from a second vector database; and generate a fourth result set, based on the first result set and the third result set, wherein the generating includes: combining the first result set and the third result set; and modifying a result having a quality metric less than a threshold.

In some embodiments, the processing circuit is further configured to obtain a third result set, from a second vector database, based on proximity to a second vector, the second vector being associated with the query, wherein the first vector includes a dense vector, and the second vector includes a sparse vector.

In some embodiments, the obtaining of the second result set from the first vector database includes obtaining the second result set from a subset, complementary to the first result set, of the first vector database.

According to an embodiment of the present disclosure, there is provided a system, including: a storage device, the storage device being configured to: receive a first vector, associated with a query, from a host; obtain a first result set, from a first vector database, the obtaining being based on proximity to a first vector; determine that an iteration criterion is met, the iteration criterion being, based on the first result set; and obtain a second result set from the first vector database, based on the determining that the iteration criterion is met.

In some embodiments, the storage device is further configured to: obtain a third result set, from a second vector database, based on proximity to a second vector, the second vector being associated with the query.

In some embodiments, the storage device is further configured to: obtain a third result set, from a second vector database; and generate a fourth result set, based on the first result set and the third result set.

In some embodiments, the storage device is further configured to: obtain a third result set, from a second vector database; and generate a fourth result set, based on the first result set and the third result set, wherein a cardinality of the fourth result set is less than a sum of a cardinality of the first result set and a cardinality of the third result set.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
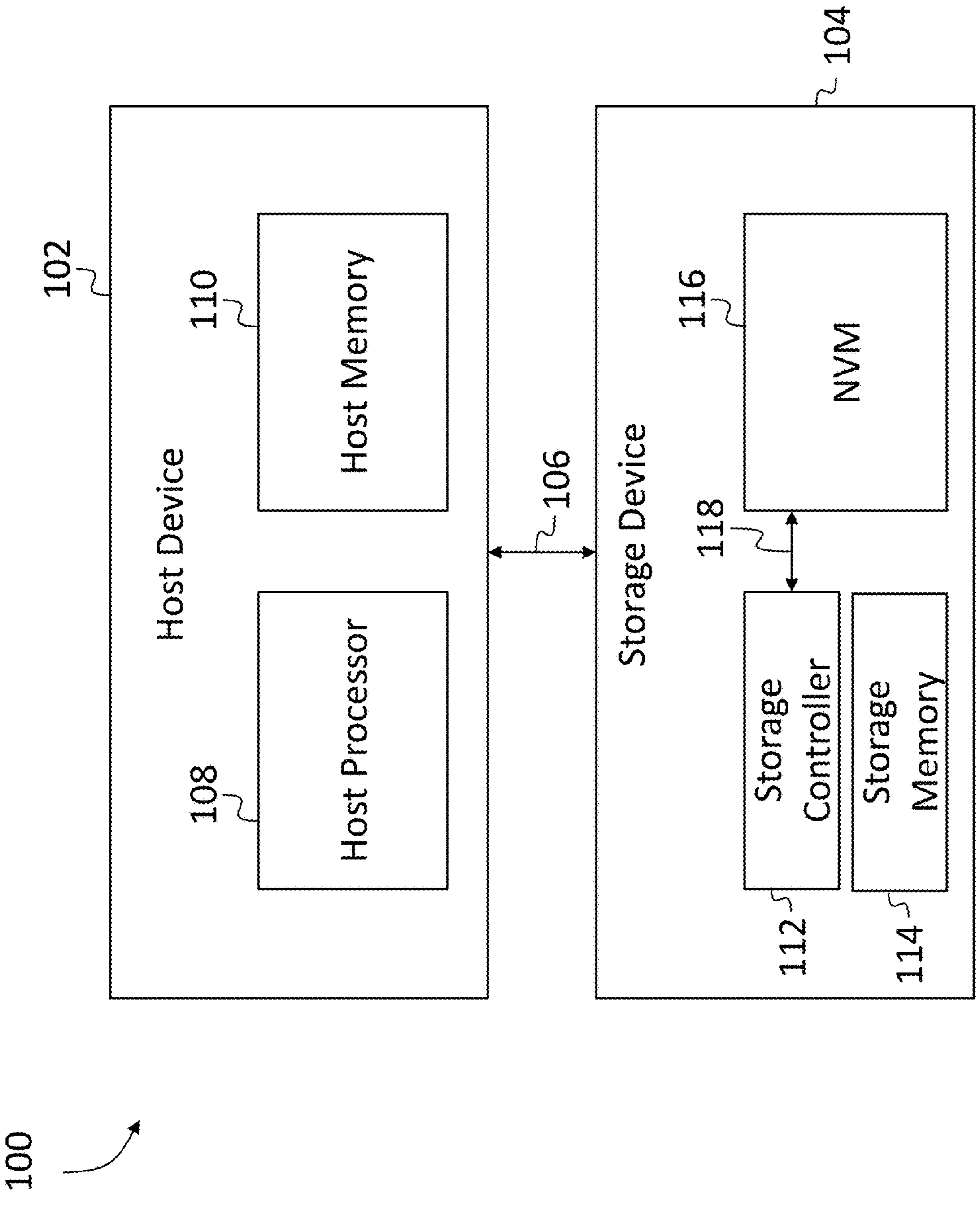
FIG. 1A is a block diagram of a host and a storage device, according to an embodiment of the present disclosure.

The detailed description set forth below in connection with the appended drawings is intended as a description of exemplary embodiments of a iterative data retriever provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Large language models are capable of providing information, in readily comprehensible form, in response to a query, or "prompt" written in natural language. Such models may be trained using publicly available information and may be helpful for organizing such information for a user. In some circumstances it may be helpful for a user to have access to other information that is not part of the training data set of large language models, because, for example, it has not been published, or it was published after the large language model was trained.

For example, employees at an enterprise may, in the course of their work, create various documents describing their work product, for example, product designs, marketing plans, specifications, or the like. Such documents may be confidential to the enterprise, and, as such, unpublished and not part of the training of a large language model. It may nonetheless be useful, however, for an employee of the enterprise to be able to perform a query on a subject and have the results include both publicly available information and information available only within the enterprise.

To provide this functionality, retrieval-augmented generation may be used in natural language processing to combine a generation-based model, which may have been trained with a large volume of publicly available data, with a retrieval model. The retrieval model may use information not used for the training of the generation-based model, because, for example, the information is not publicly available. As such, a model using retrieval-augmented generation may be capable of generating results the generation-based model is not capable of generating. For example, a system for retrieval augmented generation may augment a large language model with a system and method for searching one or more databases for one or more sets of results (or "result sets") that are relevant to the query. The databases may store data (for example, unpublished documents available within an enterprise) that are not part of the training data of the large language model. The result sets may then be fed to a large language model together with the query, and the large language model may merge the results available from public sources of information with the results from the result sets, to provide a response that takes into account both the publicly available information and the information in the databases.

In a system for retrieval augmented generation the generation of result sets for use by the large language model may involve, as discussed in further detail below, searching databases for results based on proximity to query vectors that are obtained based on the query. For stability of the system, it may be advantageous for the cardinalities of the result sets (the number of elements in each result set) to be relatively constant, with, for example, each result set including m results, or "elements". In some embodiments, this is accomplished by first obtaining relatively large result sets, by setting the maximum, or threshold, distance between the query vectors and the results, to a relatively large value, and then eliminating a large fraction of the results, for example, using a reranking and thresholding process (discussed in further detail below). Such an approach, however, may be computationally relatively inefficient, in part because the computational cost of the reranking and thresholding process may be high.

As such, in some embodiments, an iterative data retriever generates the reduced result set using an iterative approach, in which a first provisional result set is generated from initial result sets having a first combined cardinality, the first combined cardinality being selected such that the cardinality of the reduced result set is somewhat less than the target cardinality. Additional searches are then performed, each adding elements to the reduced result set, until the reduced result set reaches the target cardinality.

FIG. 1A illustrates a system, which may be referred to as a "target" 100, according to some embodiments of the present disclosure. Referring to FIG. 1A, the target 100 may include a host device 102 and a storage device 104 (which may be a persistent storage device 104). In some embodiments, the host device 102 may be housed with the storage device 104, and in other embodiments, the host device 102 may be separate from the storage device 104. The host device 102 may include any suitable computing device connected to a storage device 104 such as, for example, a personal computer (PC), a portable electronic device, a hand-held device, a laptop computer, or the like.

The host device 102 may be connected to the storage device 104 over a host interface 106. The host device 102 may issue data request commands or input-output (IO) commands (for example, read or write commands) to the storage device 104 over the host interface 106, and may receive responses from the storage device 104 over the host interface 106.

The host device 102 may include a host processor 108 and host memory 110. The host processor 108 may be a processing circuit (discussed in further detail below), for example, such as a general-purpose processor or a central processing unit (CPU) core of the host device 102. The host processor 108 may be connected to other components via an address bus, a control bus, a data bus, or the like. The host memory 110 may be considered as high performing main memory (for example, primary memory) of the host device 102. For example, in some embodiments, the host memory 110 may include (or may be) volatile memory, for example, such as dynamic random-access memory (DRAM). However, the present disclosure is not limited thereto, and the host memory 110 may include (or may be) any suitable high performing main memory (for example, primary memory) replacement for the host device 102 as would be known to those skilled in the art. For example, in other embodiments, the host memory 110 may be relatively high performing non-volatile memory, such as NAND flash memory, Phase Change Memory (PCM) (a type of memory that stores information using, in each memory cell, a change in resistance that accompanies a phase change in a material (for example, a chalcogenide) in the cell), Resistive RAM (a type of memory in which a current through a controllable resistor (or "memristor") changes its resistance, to store information), Spin-transfer Torque RAM (STTRAM) (a memory in which a spin-polarized current may be used to change the magnetization of a magnetic layer of a memory cell), any suitable memory based on PCM technology, or resistive random access memory (ReRAM), and may include, for example, or the like.

The storage device 104 may operate as secondary memory that may persistently store data accessible by the host device 102. In this context, the storage device 104 may include relatively slower memory when compared to the high performing memory of the host memory 110. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device such as, for example, a magnetic storage device (for example, a hard disk drive (HDD), or the like), an optical storage device (for example, a Blue-ray disc drive, a compact disc (CD) drive, a digital versatile disc (DVD) drive, or the like), other kinds of flash memory devices (for example, a USB flash drive, and the like), or the like. In various embodiments, the storage device 104 may conform to a large form factor standard (for example, a 3.5-inch hard drive form-factor), a small form factor standard (for example, a 2.5 inch hard drive form-factor), an M.2 form factor, an E1.S form factor, or the like. In other embodiments, the storage device 104 may conform to any suitable or desired derivative of these form factors. For convenience, the storage device 104 may be described hereinafter in the context of a solid-state drive, but the present disclosure is not limited thereto.

The storage device 104 may be communicably connected to the host device 102 over the host interface 106. The host interface 106 may facilitate communications (for example, using a connector and a protocol) between the host device 102 and the storage device 104. In some embodiments, the host interface 106 may facilitate the exchange of storage requests (or "commands") and responses (for example, command responses) between the host device 102 and the storage device 104. In some embodiments, the host interface 106 may facilitate data transfers by the storage device 104 to and from the host memory 110 of the host device 102. For example, in various embodiments, the host interface 106 (for example, the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabrics (NVMe-oF), or the like. In other embodiments, the host interface 106 (for example, the connector and the protocol thereof) may include (or may conform to) various general-purpose interfaces, for example, such as Ethernet, Universal Serial Bus (USB), and/or the like.

In some embodiments, the storage device 104 may include a storage controller 112 (which may be a processing circuit, discussed in further detail below), storage memory 114 (which may also be referred to as a buffer), non-volatile memory (NVM) 116, and a storage interface 118. The storage memory 114 may be high-performing memory of the storage device 104, and may include (or may be) volatile memory, for example, such as DRAM, but the present disclosure is not limited thereto, and the storage memory 114 may be any suitable kind of high-performing volatile or non-volatile memory. The non-volatile memory 116 may persistently store data received, for example, from the host device 102. The non-volatile memory 116 may include, for example, NAND flash memory, but the present disclosure is not limited thereto, and the non-volatile memory 116 may include any suitable kind of memory for persistently storing the data according to an implementation of the storage device 104 (for example, magnetic disks, tape, optical disks, or the like).

The storage controller 112 may be connected to the non-volatile memory 116 over the storage interface 118. In the context of the SSD, the storage interface 118 may be referred to as flash channel, and may be an interface with which the non-volatile memory 116 (for example, NAND flash memory) may communicate with a processing component (for example, the storage controller 112) or other device. Commands such as reset, write enable, control signals, clock signals, or the like may be transmitted over the storage interface 118. Further, a software interface may be used in combination with a hardware element that may be used to test or verify the workings of the storage interface 118. The software may be used to read data from and write data to the non-volatile memory 116 via the storage interface 118. Further, the software may include firmware that may be downloaded onto hardware elements (for example, for controlling write, erase, and read operations).

The storage controller 112 (which may be a processing circuit (discussed in further detail below)) may be connected to the host interface 106, and may manage signaling over the host interface 106. In some embodiments, the storage controller 112 may include an associated software layer (for example, a host interface layer) to manage the physical connector of the host interface 106. The storage controller 112 may respond to input or output requests received from the host device 102 over the host interface 106. The storage controller 112 may also manage the storage interface 118 to control, and to provide access to and from, the non-volatile memory 116. For example, the storage controller 112 may include at least one processing component embedded therein for interfacing with the host device 102 and the non-volatile memory 116. The processing component may include, for example, a general purpose digital circuit (for example, a microcontroller, a microprocessor, a digital signal processor, or a logic device (for example, a field programmable gate array (FPGA), an application-specific integrated circuit (ASIC), or the like)) capable of executing data access instructions (for example, via firmware or software) to provide access to the data stored in the non-volatile memory 116 according to the data access instructions. For example, the data access instructions may correspond to the data request commands, and may include any suitable data storage and retrieval algorithm (for example, read, write, or erase) instructions, or the like.

Figure 1B:
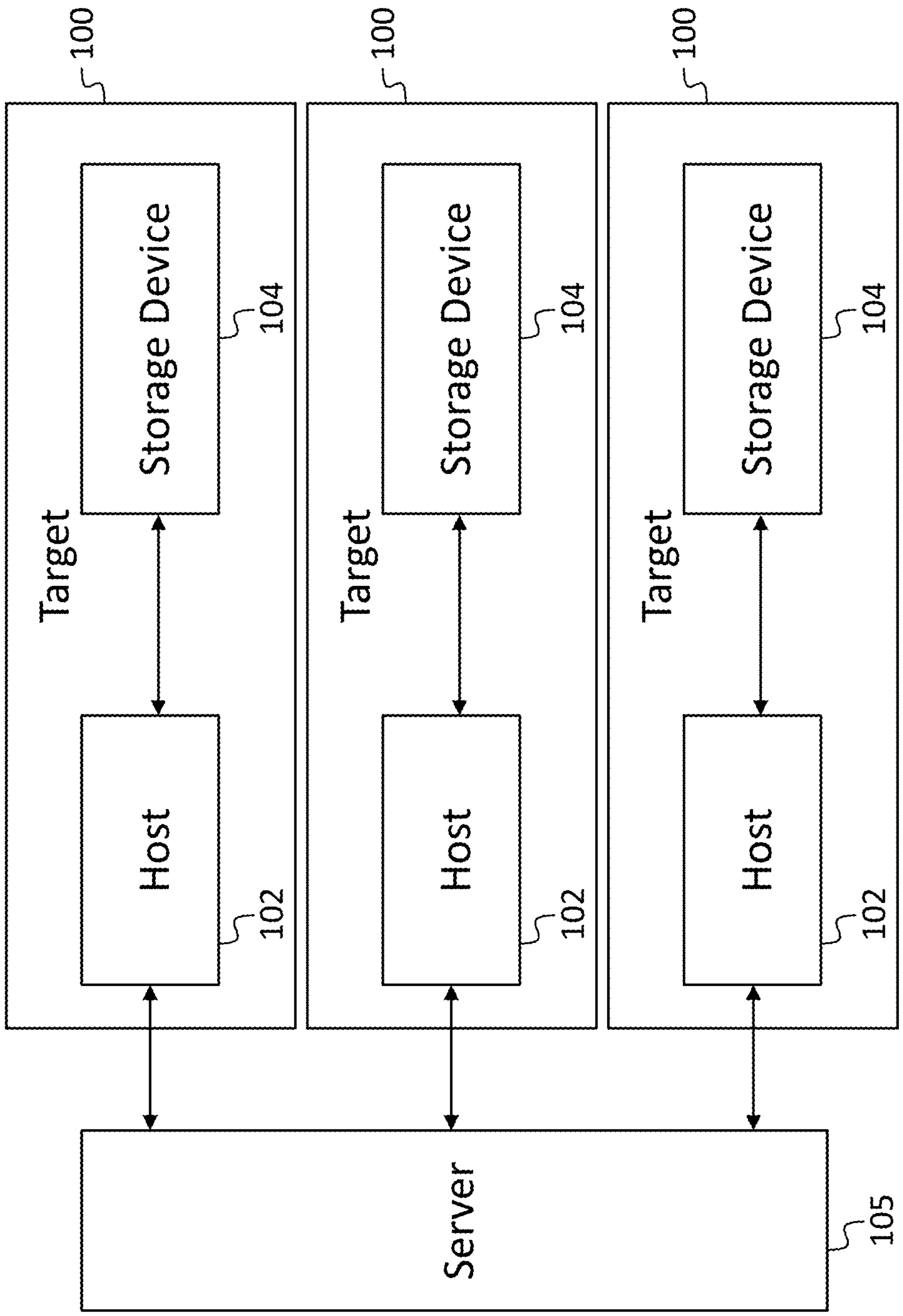
FIG. 1B is a system level block diagram, according to an embodiment of the present disclosure.

FIG. 1B is a system-level diagram, in some embodiments. Within each target 100, a host 102 is connected to a persistent storage device 104 (which may be, for example, a solid-state drive (SSD)). The persistent storage device 104 may have (as discussed above) a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface (which may be referred to as a "host interface"), through which it may be connected to the host 102, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS) or Universal Flash Storage (UFS). The persistent storage device 104 may include an interface circuit which operates as an interface adapter between the host interface 106 and one or more internal interfaces in the persistent storage device 104.

The host interface may be used by the host 102 to communicate with the persistent storage device 104, for example, by sending write and read commands, which may be received, by the persistent storage device 104, through the host interface. The host interface may also be used by the persistent storage device 104 to perform data transfers to and from system memory of the host 102.

Such data transfers may be performed using direct memory access (DMA). For example, when the host 102 sends a write command to the persistent storage device 104, the persistent storage device 104 may fetch the data to be written to the non-volatile memory 116 from the host memory 110 of the host device 102 using direct memory access, and the persistent storage device 104 may then save the fetched data to the non-volatile memory 116. Similarly, if the host 102 sends a read command to the persistent storage device 104, the persistent storage device 104 may read the requested data (i.e., the data specified in the read command) from the non-volatile memory 116 and save it in the host memory 110 of the host device 102 using direct memory access. The persistent storage device 104 may store data in a persistent memory, for example, not-AND (NAND) flash memory, for example, in memory dies containing memory cells, each of which may be, for example, a Single-Level Cell (SLC), a Multi-Level Cell (MLC), or a Triple-Level Cell (TLC).

A Flash Translation Layer (FTL) (discussed in further detail below) of the persistent storage device 104 may provide a mapping between logical addresses used by the host 102 and physical addresses of the data in the persistent memory. The persistent storage device 104 may also include (i) a buffer which may include (for example, consist of) dynamic random-access memory (DRAM), and (ii) a persistent memory controller (for example, a flash controller) for providing suitable signals to the persistent memory. Some or all of the host interface, the Flash Translation Layer, the buffer, and the persistent memory controller may be implemented in a processing circuit, which may be referred to as the persistent storage device controller.

Figure 1C:
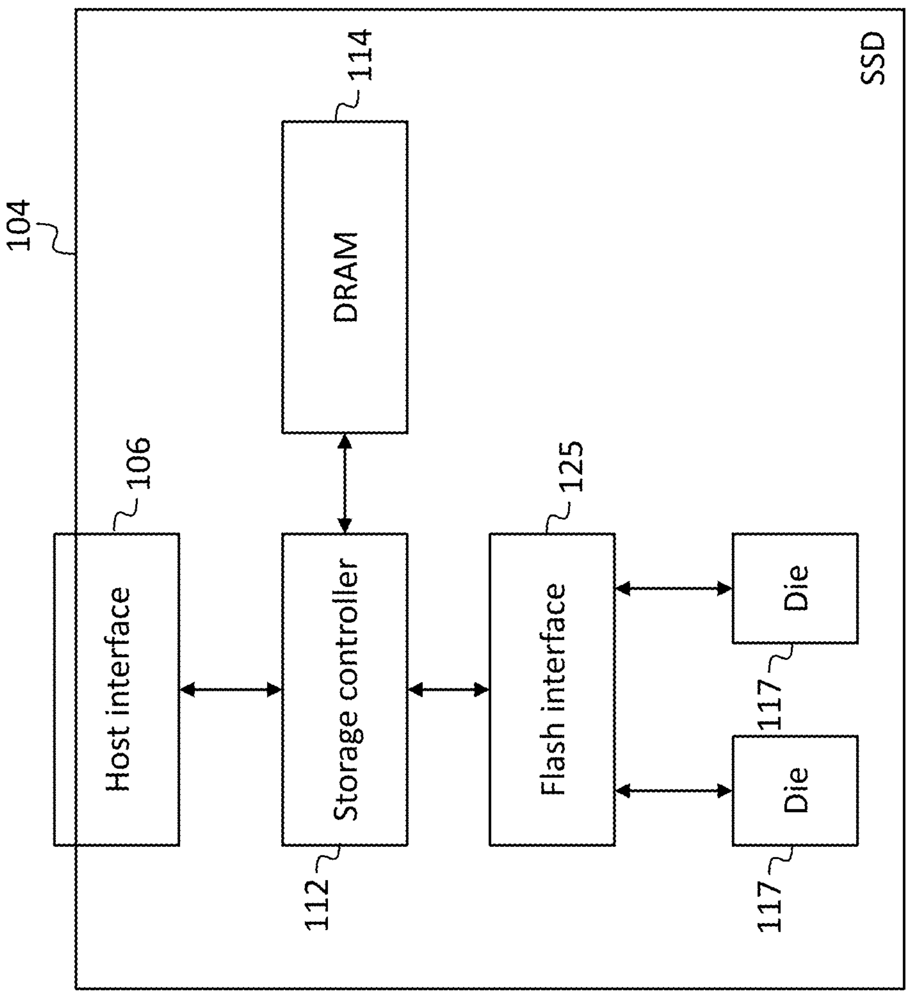
FIG. 1C is a block diagram of a storage device, according to an embodiment of the present disclosure.

FIG. 1C is a block diagram of a persistent storage device 104 (for example, a solid-state drive), in some embodiments. The host interface 106 is used by the host 102, to communicate with the persistent storage device 104. The data write and read input output commands, as well as various media management commands such as the Nonvolatile Memory Express (NVMe) Identify command and the NVMe Get Log command may be received, by the persistent storage device 104, through the host interface 106. In some embodiments, the storage device has an interface compatible with a different interface protocol, such as Small Computer System Interface (SCSI), Peripheral Component Interconnect Express (PCIe), Compute Express Link (CXL), remote direct memory access (RDMA) over Ethernet, Serial Advanced Technology Attachment (SATA), Fiber Channel, Serial Attached SCSI (SAS), NVMe over Fabrics (NVMe-oF), or the like. Ini such embodiments, commands that are similar, identical, or analogous to the Identify command or the Get Log command may be received by the persistent storage device 104, through the host interface 106. The host interface 106 may also be used by the persistent storage device 104 to perform data transfers to and from host system memory. The persistent storage device 104 may store data in non-volatile memory 116 (for example, not-AND (NAND) flash memory), for example, in memory dies 117 containing memory cells, each of which may be (as discussed above), for example, a Single-Level Cell (SLC), a Multi-Level Cell (MLC), or a Triple-Level Cell (TLC). A Flash Translation Layer (FTL), which may be implemented in the storage controller 112 (for example, based on firmware (for example, based on firmware stored in the non-volatile memory 116) may provide a mapping between logical addresses used by the host and physical addresses of the data in the non-volatile memory 116. The persistent storage device 104 may also include (i) a buffer (for example, the storage memory 114) (which may include, for example, consist of, dynamic random-access memory (DRAM)), and (ii) a flash interface (or "flash controller") 125 for providing suitable signals to the memory dies 117 of the non-volatile memory 116. Some or all of the host interface 106, the Flash Translation Layer (as mentioned above), the storage memory 114 (for example, the buffer), and the flash interface 125 may be implemented in a processing circuit, which may be referred to as the persistent storage device controller 112 (or simply as the storage controller 112).

The NAND flash memory may be read or written at the granularity of a flash page, which may be between 8 KB and 16 kB in size. Before the flash memory page is reprogrammed with new data, it may first be erased. The granularity of an erase operation may be one NAND block, or "physical block", which may include, for example, between 128 and 256 pages. Because the granularity of erase and program operations are different, garbage collection (GC) may be used to free up partially invalid physical blocks and to make room for new data. The garbage collection operation may (i) identify fragmented flash blocks, in which a large proportion (for example, most) of the pages are invalid, and (ii) erase each such physical block. When garbage collection is completed, the pages in an erased physical block may be recycled and added to a free list in the Flash Translation Layer.

The non-volatile memory 116 (for example, if it includes or is flash memory) may be capable of being programmed and erased only a limited number of times. This may be referred to as the maximum number of program/erase cycles (P/E cycles) the non-volatile memory 116 can sustain. To maximize the life of the persistent storage device 104, the persistent storage device controller 112 may endeavor to distribute write operations across all of the physical blocks of the non-volatile memory 116; this process may be referred to as wear leveling.

A mechanism that may be referred to as "read disturb" may reduce persistent storage device 104 reliability. A read operation on a NAND flash memory cell may cause the threshold voltage of nearby unread flash cells in the same physical block to change. Such disturbances may change the logical states of the unread cells, and may lead to uncorrectable error-correcting code (ECC) read errors, degrading flash endurance. To avoid this result, the Flash Translation Layer may have a counter of the total number of reads to a physical block since the last erase operation. The contents of the physical block may be copied to a new physical block, and the physical block may be recycled, when the counter exceeds a threshold (for example, 50,000 reads for Multi-Level Cell), to avoid irrecoverable read disturb errors. As an alternative, in some embodiments, a test read may periodically be performed within the physical block to check the error-correcting code error rate; if the error rate is close to the error-correcting code capability, the data may be copied to a new physical block.

Figure 2:
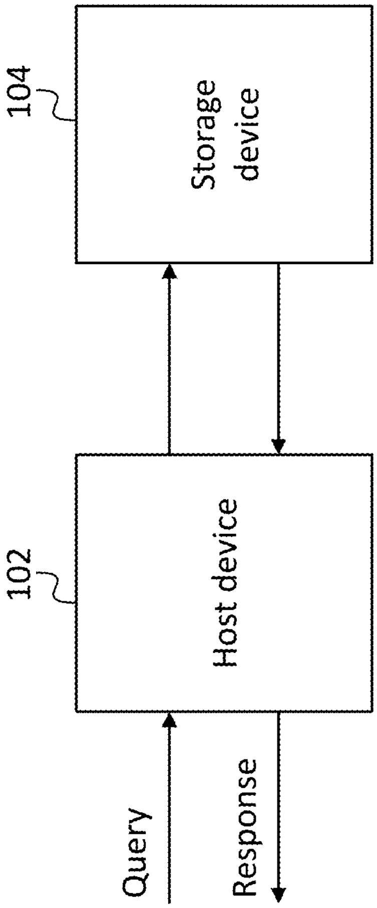
FIG. 2 is a block diagram of a host and a storage device configured to perform retrieval augmented generation, according to an embodiment of the present disclosure.

Referring to FIG. 2A, in some embodiments, as mentioned above, a host device 102 or a storage device 104, or a combination of a host device 102 or a storage device 104, may be used to implement retrieval augmented generation, as discussed in further detail below. Various methods or operations may be performed as part of the retrieval augmented generation; these methods or operations may be performed in the host device 102, or in the storage device 104, or some of the methods or operations may be performed in the host device 102, and some of the methods or operations may be performed in the storage device 104.

For example, the host device 102 may receive a query (or "prompt"), process the query, and send the results of the processing to the storage device 104. The storage device 104 may perform further processing, and return further results to the host device 102. The host device 102 may then perform further processing and return the final query result. In some embodiments, the processing is performed entirely in the host device 102, with the storage device 104 playing no role (and optionally being absent), or with the storage device 104 operating only to store data for use by the host device 102. Conversely, in some embodiments, the host device 102 plays no role except to relay the query to the storage device 104 and to relay the result back to the client (with the storage device 104 performing all of the processing), or the host device 102 may play no role and may optionally be absent, and the storage device 104 may receive the query directly from the client and return the response directly to the client.

Figure 3A:
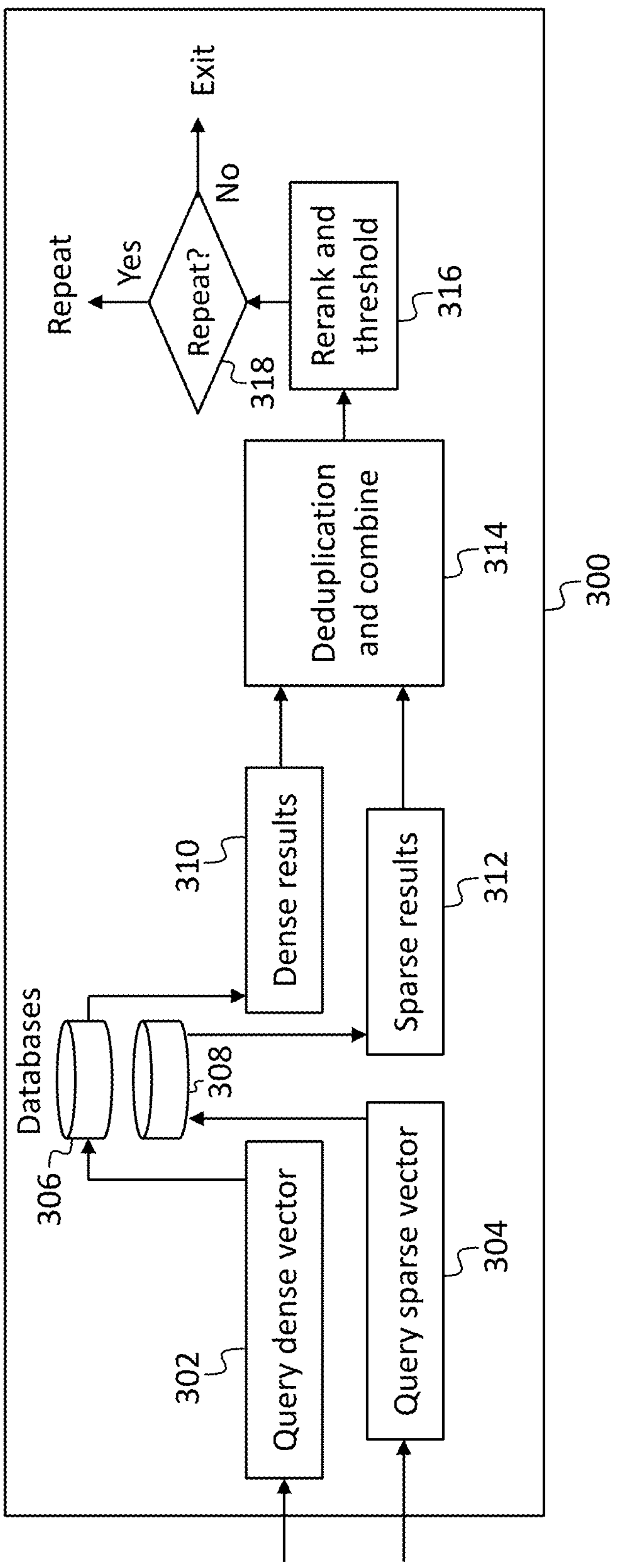
FIG. 3A is a block diagram of an iterative data retriever, according to an embodiment of the present disclosure.

FIG. 3A is a block diagram showing data products and operations of an iterative data retriever or "iterative convergent retriever" 300. The input to the iterative data retriever 300 may include a first vector, for example, a query dense vector 302, and a second vector, for example, a query sparse vector 304. The query dense vector 302 and the query sparse vector 304 may be generated based on the query (or "prompt") by prompt expansion (discussed in further detail below, in the context of FIG. 3B). The iterative data retriever 300 may include a first database 306, which may be or include a database of dense vectors, and a second database 308, which may be or include a database of sparse vectors. In some embodiments, the first database 306 and the second database 308 are implemented as a single database, to similar effect. Each of the first database 306 and the second database 308 may be stored in the non-volatile memory 116 of the storage device 104.

In operation, the iterative data retriever 300 may receive the query dense vector 302 and the query sparse vector 304, and perform an initial search of the databases. The search of the first database 306 may be configured to return a first result set 310 including k results from the first database 306 (k being a positive integer). The search of the second database 308 may be configured to return a second result set 312 including k results from the second database 308. In some embodiments, the search of the second database is configured to return more or fewer than k results.

Each entry in the first database 306 may include a label, the label being a dense vector, and a payload, including, for example, a document or a portion of a document associated with the label. The search of the first database 306 may be based on proximity to the query dense vector 302; for example, the search may be configured to return the k database entries that have labels closest (by a suitable metric, for example, a Euclidean distance) to the query dense vector 302. Similarly, the search of the second database 308 may be based on proximity to the query sparse vector 304, for example, the search may be configured to return the k database entries that have labels closest (by a suitable metric, for example, a Euclidean distance) to the query sparse vector 304.

The target number of results to be returned by the iterative data retriever 300 may be less than k, for example, it may be a positive integer m, where m is less than k. As such, a process may be used to reduce the number of results from those returned by the two searches. This process may include a deduplication and combination process 314 and a reranking and thresholding process 316. In the deduplication step of the deduplication and combination process 314, duplicates may be removed from the first result set 310 and the second result set 312, where a duplicate is an element of a result set that includes, for example, the same payload as an element of another result set. For example, it may be that a result returned by the search of the first database 306 has the same payload as a result returned by the search of the second database 308; when this occurs the deduplication step may remove one or the other of the two results. The combination step of the deduplication and combination process 314 may involve combining the first result set 310 and the second result set 312 (for example, before or after the deduplication step is performed to remove any duplicates).

In the reranking and thresholding process 316, a machine learning model may be used to calculate a quality metric for each of the elements of the result set. This machine learning model may be trained using supervised training, with training data consisting of triplets, each triplet including a query, a positive response (one that is relevant to the query) and a negative response (one that is irrelevant to the query). The output of the machine learning model may be a quality metric in the range of zero to one, as an assessment of the extent to which any response is relevant to a query. The cost function used to train the neural network may be a function that rewards correctly assigning a high quality metric to the positive response and correctly assigning a low quality metric to the negative response.

In the reranking and thresholding process 316, one or more results that score below a threshold when assessed by the machine learning model may be eliminated, leaving a further reduced result set. An iteration criterion may then be evaluated, at 318. The iteration criterion may be based on the cardinality of the result set (where the cardinality of the result set is the number of elements it includes); if the cardinality of the result set is less than a target cardinality m (m being a positive integer), then at 318, the process determines that the iterations have not been completed and the process is repeated, with new searches being performed in the first database 306 and in the second database 308, to generate, for example, a third result set and a fourth result set, respectively. During these new searches, results that were found during previous searches of the first database 306 and the second database 308 may be prevented from becoming part of one of the result sets. If, at 318, it is determined that the iteration criterion is not met (because the cardinality of the result set is greater than or equal to m), then the iterative data retriever 300 exits, having found a suitable result set. If on the last iteration the number of results exceeds m, then the threshold used in the reranking and thresholding process 316 may be increased so as to reduce the number of results to m.

Figure 3B:
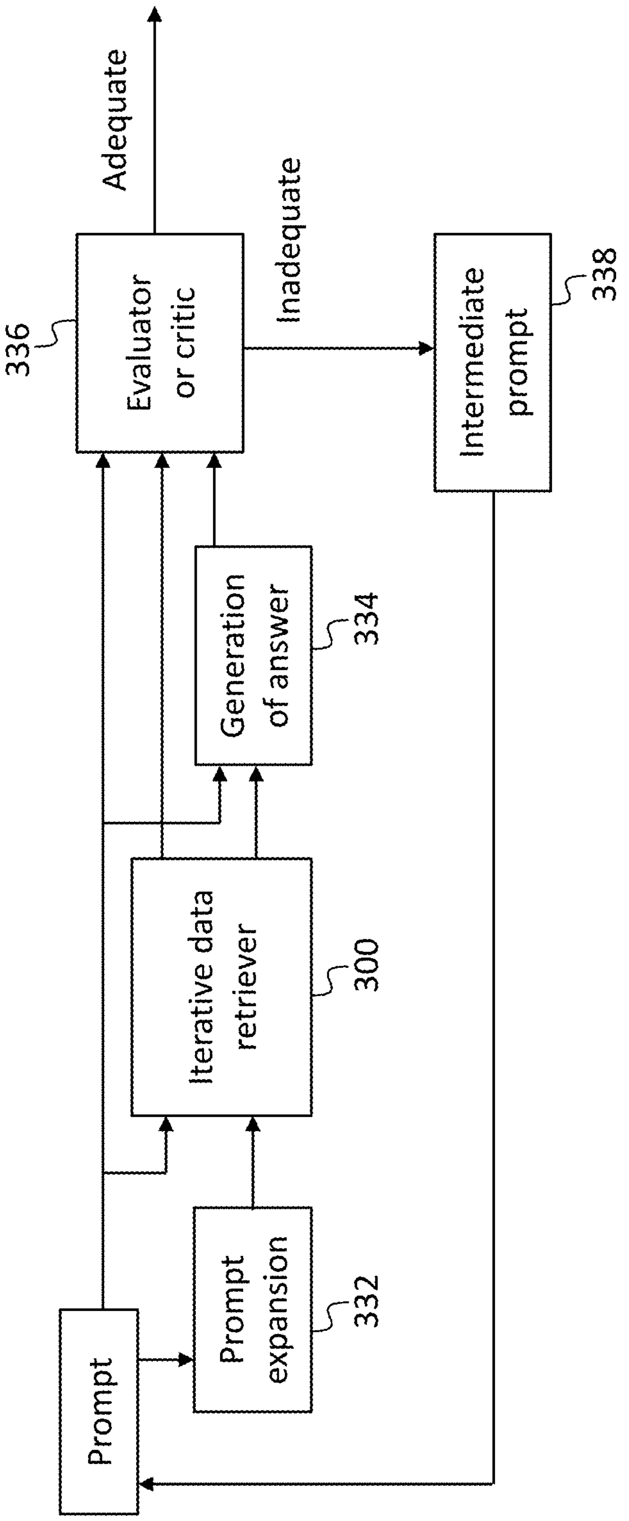
FIG. 3B is a block diagram of a system and method for retrieval augmented generation, according to an embodiment of the present disclosure.

FIG. 3B illustrates a system for retrieval augmented generation, in some embodiments. A prompt 330 is received by the system, and converted to a query dense vector 302 and a query sparse vector 304 in a prompt expansion operation 332. The prompt expansion operation 332 may include the use of a tokenizer to identify recognized tokens in the query, forming the query sparse vector 304 (the query sparse vector 304 generally being sparse because it may include a value of zero for each element corresponding to a token from the token dictionary that is not recognized in the query). The prompt expansion operation 332 may further include processing with a neural network that generates, from the prompt, the query dense vector 302. This neural network may, like the machine learning model used to perform the reranking and thresholding process 316, be trained to assess the relevance of an answer by supervised training with training data consisting of triplets, each triplet including a query, a positive response (one that is relevant to the query) and a negative response (one that is irrelevant to the query). The structure of this neural network may include, for example, a transformer layer, a pooling layer, and a multi-layer perceptron. The query dense vector 302 may be a latent vector generated by a hidden layer (e.g., the last hidden layer) of the neural network.

The query dense vector 302 and the query sparse vector 304 may be fed from the prompt expansion operation 332 to the iterative data retriever 300 as shown. As mentioned above, the iterative data retriever 300 may generate, based on the databases it includes and the methods disclosed herein, a result set having a cardinality of m elements (for example, containing m elements). The result set may be fed to a first large language model 334 for generation of an answer (for example, a response to the query). The answer may then be fed, (along with the prompt and the result set generated by the iterative data retriever 300) to an evaluator 336 (or "critic") which may be a second large language model. The evaluator may generate an assessment (for example, a number in the range from zero to one) of the quality of the response produced by the first large language model 334. If the assessment is sufficiently high (for example, if it exceeds a threshold) then the response produced by the first large language model 334 may be deemed adequate, and delivered as the output of the retrieval augmented generation system.

If the assessment is not sufficiently high (for example, if it falls below the threshold) then the evaluator 336 may generate a different prompt (for example, different from all previously used prompts) and this different prompt may be processed in the same manner as the original prompt to generate a new answer from the first large language model 334. In general, the process of generating an answer (by the first large language model 334), assessing the answer by the evaluator 336, and generating a new prompt, by the evaluator 336, may be repeated until a completion criterion is met, where the completion criterion may be met when (i) the response produced by the first large language model 334 may be deemed adequate, or (ii) a set number of iterations has been completed or (iii) both (a) a set number of iterations has been completed and (b) the response produced by the first large language model 334 is deemed adequate.

As mentioned above, the tasks involved in the execution of the retrieval augmented generation may be performed entirely in the host device 102, entirely in the storage device 104, or in part in the host device 102 and in part in the storage device 104. For example, the iterative data retriever 300 may be executed entirely by the storage device 104, or all of the iterative data retriever 300 except the reranking may be executed by the storage device; in either case the remaining operations of the retrieval augmented generation may be performed by the host device 102.

Figure 4:
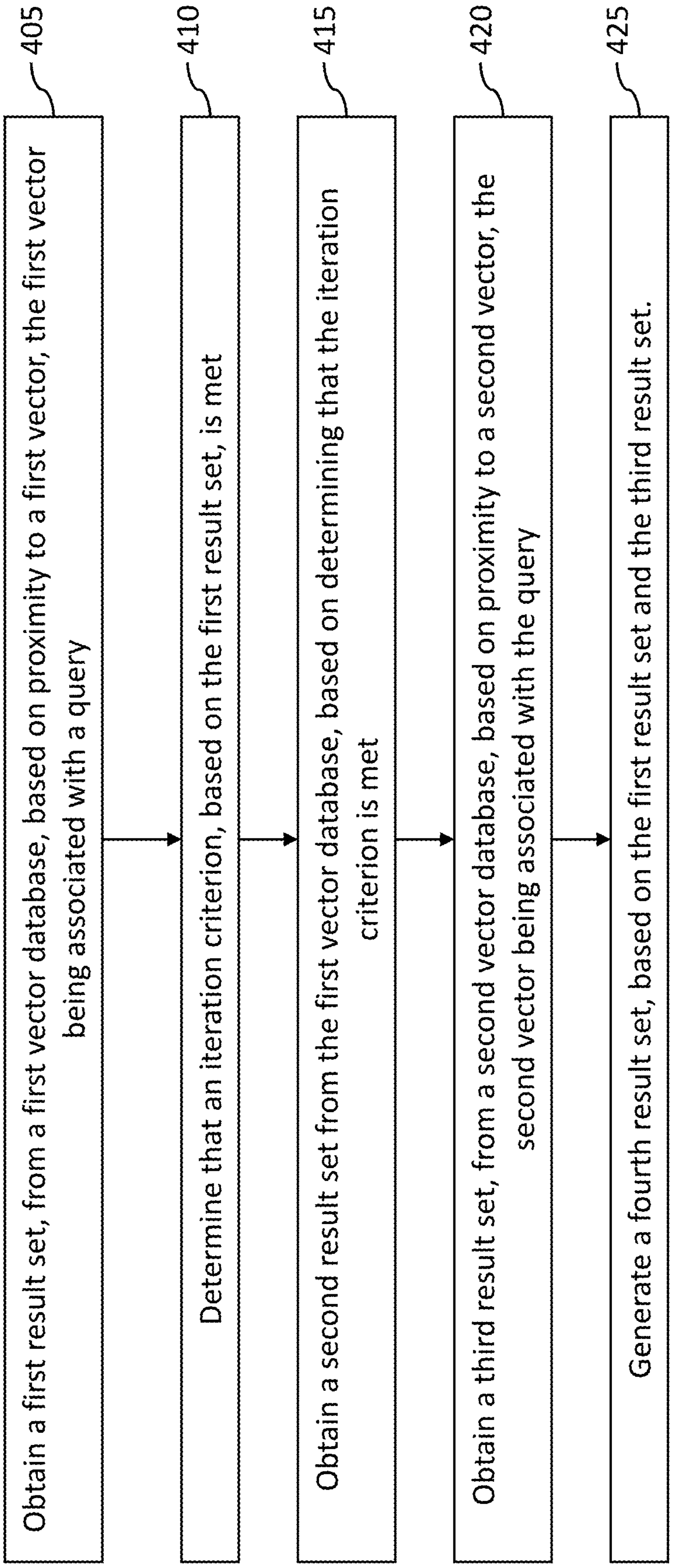
FIG. 4 is a flow chart of a method, according to an embodiment of the present disclosure.

FIG. 4 shows a method of retrieval augmented generation, in some embodiments. Although FIG. 4 illustrates various operations in a method of retrieval augmented generation, embodiments according to the present disclosure are not limited thereto. For example, according to some embodiments, a method of retrieval augmented generation may include additional operations or fewer operations, or the order of operations may vary (unless otherwise explicitly stated or implied) without departing from the spirit and scope of embodiments according to the present disclosure.

In some embodiments, the method includes, obtaining, at 405, a first result set, from a first vector database, based on proximity to a first vector, the first vector being associated with a query. As discussed above in the context of FIG. 3A, the first vector may be the query dense vector 302 or the query sparse vector 304, and the obtaining may include finding the k results based on proximity to the first vector, for example, the k results that are closest by some measure of distance (for example, closest according to the Euclidean distance) to the first vector. The method may further include determining, at 410, that an iteration criterion, based on the first result set, is met.

The iteration criterion may be a criterion that is met when the cardinality of the reduced result set is less than the target value m, where the reduced result set is the set formed, for example, (i) after the reranking and thresholding process 316, or (ii) after (a) an additional result set is obtained by obtaining a result set from a second vector database based on proximity to a second vector and (b) the deduplication and combination process 314 and (c) the reranking and thresholding process 316. The method may further include, at 415, obtaining a second result set (referred to as the third result set or the fourth result set in the discussion, above, of FIG. 3A) from the first vector database based on determining that the iteration criterion is met. When the iteration criterion is met, this indicates that additional results are to be added to the result set before it is fed (along with the prompt) to the first large language model 334. As such, when the iteration criterion is met an additional search of the first database 306, or an additional search of the second database 308 (or both) may be performed, to identify additional results as candidates for inclusion in the reduced result set.

The method may further include obtaining, at 420, a third result set (referred to as the second result set in the discussion, above, of FIG. 3A), from a second vector database, based on proximity to a second vector, the second vector being associated with the query. As discussed in the context of FIG. 3A, for example, in some embodiments two databases, for example, the first database 306 and the second database 308, are searched, based on proximity to a query dense vector 302 and a query sparse vector 304 respectively, to generate respective result sets. If the search is part of a subsequent iteration (for example, if it is not the first search performed for the query) then results already found during searches performed in previous iterations may be omitted from the result sets, e.g., the obtaining of a second result set from the first database 306, after having obtained a first result set from the first database 306, may include obtaining the second result set from a first subset of the first database 306 (where a "subset" of a database means a subset of the elements stored in the database), the first subset being complementary to the first result set (where two subsets are complementary when their intersection is the empty set and their union is the set of which they are subsets). The method may further include generating, at 425, a fourth result set, based on the first result set and the third result set. This fourth result set may be, for example, the result of the combining process that is part of the deduplication and combination process 314, or it may be the reduced result set for which the iteration criterion is evaluated.

In some embodiments, a cardinality of the fourth result set is less than a sum of a cardinality of the first result set and a cardinality of the third result set. As discussed in the context of FIG. 3A, for example, this reduction in cardinality (for example, in the number of elements) may occur because (i) elements (results) of the result set may be removed (in the deduplication and combination process 314) because they are duplicates, or because (ii) elements may be removed (in the reranking and thresholding process 316) because they have an insufficient quality metric (for example, a quality metric less than a threshold).

In some embodiments, the use of the systems and methods disclosed herein result in more stable operation of retrieval augmented generation by supplying a fixed number of results to the first large language model 334 and to the evaluator 336. Moreover, the iterative data retriever 300, by iteratively performing searches that return more than the target number of results, m, and reducing the number of results by the deduplication and combination process 314 and by the reranking and thresholding process 316, may converge significantly more rapidly to an acceptable reduced result set than other approaches (for example, performing an initial search for k results from each database, with k selected to be sufficiently large that at least m results will remain, on the first iteration, after the deduplication and combination process 314 and after the reranking and thresholding process 316). As such, the iterative data retriever 300, and other systems and methods disclosed herein, provide Improvements in the technology of retrieval augmented generation.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A method, comprising:
   - obtaining a first result set, from a first vector database, the obtaining being based on proximity to a first vector, the first vector being associated with a query;
   - determining that an iteration criterion is met, the iteration criterion being based on the first result set; and
   - obtaining a second result set from the first vector database, based on the determining that the iteration criterion is met.

2. The method of statement 1, further comprising:
   - obtaining a third result set, from a second vector database, based on proximity to a second vector, the second vector being associated with the query.

3. The method of statement 1 or statement 2, further comprising:
   - obtaining a third result set, from a second vector database; and
   - generating a fourth result set, based on the first result set and the third result set.

4. The method of any one of the preceding statements, further comprising:
   - obtaining a third result set, from a second vector database; and
   - generating a fourth result set, based on the first result set and the third result set, wherein a cardinality of the fourth result set is less than a sum of a cardinality of the first result set and a cardinality of the third result set.

5. The method of any one of the preceding statements, further comprising:
   - obtaining a third result set, from a second vector database; and
   - generating a fourth result set, based on the first result set and the third result set, wherein the generating comprises:
     - combining the first result set and the third result set; and
     - modifying a duplicate result.

6. The method of any one of the preceding statements, further comprising:
   - obtaining a third result set, from a second vector database; and
   - generating a fourth result set, based on the first result set and the third result set, wherein the generating comprises:
     - combining the first result set and the third result set; and
     - modifying a result having a quality metric less than a threshold.

7. The method of any one of the preceding statements, further comprising obtaining a third result set, from a second vector database, based on proximity to a second vector, the second vector being associated with the query, wherein the first vector comprises a dense vector, and the second vector comprises a sparse vector.

8. The method of any one of the preceding statements, wherein the obtaining of the second result set from the first vector database comprises obtaining the second result set from a subset, complementary to the first result set, of the first vector database.

9. A storage device, comprising:
   - a processing circuit; and
   - non-volatile memory, the processing circuit being configured to:

obtain a first result set, from a first vector database, the obtaining being based on proximity to a first vector, the first vector being associated with a query;

determine that an iteration criterion is met, based on the first result set; and obtain a second result set from the first vector database, based on the determining that the iteration criterion is met.

10. The storage device of statement 9, wherein the processing circuit is further configured to:

obtain a third result set, from a second vector database, based on proximity to a second vector, the second vector being associated with the query.

11. The storage device of statement 9 or statement 10, wherein the processing circuit is further configured to:

obtain a third result set, from a second vector database; and generate a fourth result set, based on the first result set and the third result set.

12. The storage device of any one of statements 9 to 11, wherein the processing circuit is further configured to:

obtain a third result set, from a second vector database; and generate a fourth result set, based on the first result set and the third result set, wherein a cardinality of the fourth result set is less than a sum of a cardinality of the first result set and a cardinality of the third result set.

13. The storage device of any one of statements 9 to 12, wherein the processing circuit is further configured to:

obtain a third result set, from a second vector database; and generate a fourth result set, based on the first result set and the third result set, wherein the generating comprises: combining the first result set and the third result set; and modifying a duplicate result.

14. The storage device of any one of statements 9 to 13, wherein the processing circuit is further configured to:

obtain a third result set, from a second vector database; and generate a fourth result set, based on the first result set and the third result set, wherein the generating comprises: combining the first result set and the third result set; and modifying a result having a quality metric less than a threshold.

15. The storage device of any one of statements 9 to 14, wherein the processing circuit is further configured to obtain a third result set, from a second vector database, based on proximity to a second vector, the second vector being associated with the query, wherein the first vector comprises a dense vector, and the second vector comprises a sparse vector.

16. The storage device of any one of statements 9 to 15, wherein the obtaining of the second result set from the first vector database comprises obtaining the second result set from a subset, complementary to the first result set, of the first vector database.

17. A system, comprising:

a storage device, the storage device being configured to:

receive a first vector, associated with a query, from a host;

obtain a first result set, from a first vector database, the obtaining being based on proximity to a first vector;

determine that an iteration criterion is met, the iteration criterion being, based on the first result set; and obtain a second result set from the first vector database, based on the determining that the iteration criterion is met.

18. The system of statement 17, wherein the storage device is further configured to: obtain a third result set, from a second vector database, based on proximity to a second vector, the second vector being associated with the query.

19. The system of statement 17 or statement 18, wherein the storage device is further configured to:

obtain a third result set, from a second vector database; and generate a fourth result set, based on the first result set and the third result set.

20. The system of any one of statements 17 to 19, wherein the storage device is further configured to:

obtain a third result set, from a second vector database; and generate a fourth result set, based on the first result set and the third result set, wherein a cardinality of the fourth result set is less than a sum of a cardinality of the first result set and a cardinality of the third result set.

Although exemplary embodiments of a iterative data retriever have been specifically described and illustrated herein, many modifications and variations will be apparent to those skilled in the art. Accordingly, it is to be understood that a iterative data retriever constructed according to principles of this disclosure may be embodied other than as specifically described herein. The invention is also defined in the following claims, and equivalents thereof.

What is claimed is:

1. A method, comprising:

obtaining a first result set, from a first vector database, the obtaining being based on proximity to a first vector, the first vector being associated with a query;

adding a first element of the first result set to an added result set;

determining that an iteration criterion is met, the iteration criterion being based on the first result set; and in response to determining that the iteration criterion is met:

obtaining a second result set from the first vector database; and adding a second element of the second result set to the added result set, wherein:

the determining that the iteration criterion is met comprises determining that a cardinality of the added result set, after the addition of the first element, is less than a set number; and the adding of the second element to the added result set causes the cardinality of the added result set to reach the set number.

2. The method of claim 1, further comprising:

obtaining a fourth result set, from a second vector database, based on proximity to a second vector, the second vector being associated with the query.

3. The method of claim 1, further comprising:

obtaining a fourth result set, from a second vector database; and generating a fifth result set, based on the first result set and the fourth result set.

4. The method of claim 1, further comprising:

obtaining a fourth result set, from a second vector database; and generating a fifth result set, based on the first result set and the fourth result set, wherein a cardinality of the fifth result set is less than a sum of the cardinality of the first result set and a cardinality of the fourth result set.

5. The method of claim 1, further comprising:
obtaining a fourth result set, from a second vector database; and
generating a fifth result set, based on the first result set and the fourth result set, wherein the generating comprises:
combining the first result set and the fourth result set; and
modifying a duplicate result.

6. The method of claim 1, further comprising:
obtaining a fourth result set, from a second vector database; and
generating a fifth result set, based on the first result set and the fourth result set, wherein the generating comprises:
combining the first result set and the fourth result set; and
modifying a result having a quality metric less than a threshold.

7. The method of claim 1, further comprising:
obtaining a fourth result set, from a second vector database, based on proximity to a second vector, the second vector being associated with the query, wherein the first vector comprises a dense vector, and the second vector comprises a sparse vector.

8. The method of claim 1, wherein the obtaining of the second result set from the first vector database comprises obtaining the second result set from a subset, complementary to the first result set, of the first vector database.

9. A storage device, comprising:
a processing circuit; and
non-volatile memory,
the processing circuit being configured to:
obtain a first result set, from a first vector database, the obtaining being based on proximity to a first vector, the first vector being associated with a query;
add a first element of the first result set to an added result set;
determine that an iteration criterion is met, the iteration criterion being based on the first result set; and
in response to determining that the iteration criterion is met: obtain a second result set from the first vector database; and add a second element of the second result set to the added result set,
wherein:
the determining that the iteration criterion is met comprises determining that a cardinality of the added result set, after the addition of the first element, is less than a set number; and
the adding of the second element to the added result set causes the cardinality of the added result set to reach the set number.

10. The storage device of claim 9, wherein the processing circuit is further configured to:
obtain a fourth result set, from a second vector database, based on proximity to a second vector, the second vector being associated with the query.

11. The storage device of claim 9, wherein the processing circuit is further configured to:
obtain a fourth result set, from a second vector database; and
generate a fifth result set, based on the first result set and the fourth result set.

12. The storage device of claim 9, wherein the processing circuit is further configured to:
obtain a fourth result set, from a second vector database; and
generate a fifth result set, based on the first result set and the fourth result set, wherein a cardinality of the fifth result set is less than a sum of the cardinality of the first result set and a cardinality of the fourth result set.

13. The storage device of claim 9, wherein the processing circuit is further configured to:
obtain a fourth result set, from a second vector database; and
generate a fifth result set, based on the first result set and the fourth result set, wherein the generating comprises:
combining the first result set and the fourth result set; and
modifying a duplicate result.

14. The storage device of claim 9, wherein the processing circuit is further configured to:
obtain a fourth result set, from a second vector database; and
generate a fifth result set, based on the first result set and the fourth result set, wherein the generating comprises:
combining the first result set and the fourth result set; and
modifying a result having a quality metric less than a threshold.

15. The storage device of claim 9, wherein the processing circuit is further configured to:
obtain a fourth result set, from a second vector database, based on proximity to a second vector, the second vector being associated with the query, wherein the first vector comprises a dense vector, and the second vector comprises a sparse vector.

16. The storage device of claim 9, wherein the obtaining of the second result set from the first vector database comprises obtaining the second result set from a subset, complementary to the first result set, of the first vector database.

17. A system, comprising:
a storage device,
the storage device comprising:
a processing circuit; and
non-volatile memory,
the processing circuit being configured to:
receive a first vector, associated with a query, from a host;
obtain a first result set, from a first vector database, the obtaining being based on proximity to the first vector;
add a first element of the first result set to an added result set;
determine that an iteration criterion is met, the iteration criterion being, based on the first result set; and
in response to determining that the iteration criterion is met:
obtain a second result set from the first vector database; and
add a second element of the second result set to the added result set,
wherein:
the determining that the iteration criterion is met comprises determining that a cardinality of the added result set, after the addition of the first element, is less than a set number; and
the adding of the second element to the added result set causes the cardinality of the added result set to reach the set number.

18. The system of claim 17, wherein the storage device is further configured to:
obtain a fourth result set, from a second vector database, based on proximity to a second vector, the second vector being associated with the query.

19. The system of claim 17, wherein the storage device is further configured to:

obtain a fourth result set, from a second vector database; and generate a fifth result set, based on the first result set and the fourth result set.

20. The system of claim 17, wherein the storage device is further configured to:

obtain a fourth result set, from a second vector database; and generate a fifth result set, based on the first result set and the fourth result set, wherein a cardinality of the fifth result set is less than a sum of the cardinality of the first result set and a cardinality of the fourth result set.

* * * * *